United States Patent
Chen et al.

(10) Patent No.: US 12,424,070 B2
(45) Date of Patent: Sep. 23, 2025

(54) SMOKE DETECTOR AND OPTICAL SENSING SYSTEM

(71) Applicant: PixArt Imaging Inc., Hsin-Chu (TW)

(72) Inventors: Ching-Kun Chen, Hsin-Chu (TW); Guo-Zhen Wang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 217 days.

(21) Appl. No.: 18/221,377

(22) Filed: Jul. 12, 2023

(65) Prior Publication Data
US 2025/0022357 A1    Jan. 16, 2025

(51) Int. Cl.
*G08B 17/107*    (2006.01)
*G01N 21/47*    (2006.01)

(52) U.S. Cl.
CPC ....... *G08B 17/107* (2013.01); *G01N 21/4738* (2013.01)

(58) Field of Classification Search
CPC .. G08B 17/107; G01N 21/4738; G01N 21/53; G01N 21/274
USPC ........................................... 356/446
See application file for complete search history.

(56) References Cited

U.S. PATENT DOCUMENTS

| 3,887,815 | A | * | 6/1975 | Kawakami | ............ | G01N 21/53 340/630 |
| 10,175,715 | B2 | | 1/2019 | Wu | | |
| 10,551,211 | B2 | | 2/2020 | Hsu | | |
| 2009/0228746 | A1 | * | 9/2009 | Yang | ....................... | H03L 7/085 714/707 |

* cited by examiner

*Primary Examiner* — Sunghee Y Gray
(74) *Attorney, Agent, or Firm* — Winston Hsu (57) ABSTRACT

A smoke detector comprises a light source, an optical sensor, a first, and a second processing circuit. The optical sensor senses optical data and comprises; a first oscillator, generating a first oscillating signal; and a second oscillator, generating a second oscillating signal. The first processing circuit generates a first command to instruct the first oscillator to oscillate for a first expected oscillating time, and acquires a first real oscillating time, wherein the first processing circuit further computes a time relation between the first expected oscillating time and the first real oscillating time. The first processing circuit generates a second command to instruct the second oscillator to oscillate for a second expected oscillating time according to the time relation. The second processing circuit controls the smoke detector to generate a first alarm according to the time relation. The optical sensor can also be applied to other electronic devices.

12 Claims, 7 Drawing Sheets

Calibration

Without calibration

SMOKE DETECTOR AND OPTICAL SENSING SYSTEM

BACKGROUND OF THE INVENTION

1. Field of the Invention

The present invention relates to a smoke detector and an optical sensing system, and particularly relates to a smoke detector and an optical sensing system which can compensate signal decay caused by a high temperature.

2. Description of the Prior Art

A conventional optical sensor, such as an image sensor, always comprises a plurality of pixels and is configured to sense optical data (e.g., images) via exposing the pixels. More specifically, pixels generate sensing signals corresponding received light, and such sensing signals correspond to the optical data sensed by the optical sensor. However, the sensing signals may decay if the temperature around the optical sensor is high, since the components of the optical sensor may be affected by the high temperature.

SUMMARY OF THE INVENTION

One objective of the present invention is to provide an optical sensing system which can compensate the signal decay caused by a high temperature.

Another objective of the present invention is to provide a smoke detector which can rapidly generate a fire alarm responding to a high temperature and can avoid false alarms.

One embodiment of the present invention discloses a smoke detector comprising a light source, an optical sensor, a first processing circuit and a second processing circuit. The light source, configured to emit light. The optical sensor is configured to sense optical data generated according to the light, comprising; a first oscillator, configured to generate a first oscillating signal with a first oscillating frequency; and a second oscillator, configured to generate a second oscillating signal with a second oscillating frequency different from the first oscillating frequency. The first processing circuit is configured to generate a first command to instruct the first oscillator to oscillate for a first expected oscillating time, and configured to receive the first oscillating signal and then acquire a first real oscillating time in which the first oscillator really oscillates responding to the first command, wherein the first processing circuit further computes a time relation between the first expected oscillating time and the first real oscillating time, wherein the first processing circuit generates a second command to instruct the second oscillator to oscillate for a second expected oscillating time according to the time relation. The second processing circuit is configured to control the smoke detector to generate a first alarm according to the time relation.

In one embodiment, the time relation is used for generating the first alarm but is not used for calibrating oscillating signals of the second oscillator.

Another embodiment of the present invention discloses an optical sensing system comprising an optical sensor and a first processing circuit. The optical sensor is configured to sense optical data, comprising; a first oscillator, configured to generate a first oscillating signal with a first oscillating frequency; and a second oscillator, configured to generate a second oscillating signal with a second oscillating frequency different from the first oscillating frequency, wherein the optical sensor computes an exposure time according to one of the first oscillating signal and the second oscillating signal, and computes a frame interval time according to the other one of the first oscillating signal and the second oscillating signal. The first processing circuit, configured to generate a first command to instruct the first oscillator to oscillate for a first expected oscillating time, and configured to receive the first oscillating signal and then acquire a first real oscillating time in which the first oscillator really oscillates responding to the first command, wherein the first processing circuit further computes a time relation between the first expected oscillating time and the first real oscillating time, wherein the first processing circuit generates a second command to instruct the second oscillator to oscillate for a second expected oscillating time according to the time relation.

In view of above-mentioned embodiments, the signal decay of an optical sensor's sensing signals caused a high temperature can be compensated. Besides, a smoke detector provided by the present invention can generate a fire alarm more rapidly and more precisely.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. The term "first", "second", "third" in following descriptions are only for the purpose of distinguishing different one elements, and do not mean the sequence of the elements. For example, a first device and a second device only mean these devices can have the same structure but are different devices. Besides, in following embodiments, a first oscillator means an oscillator which is used as a reference for calibration, and a second oscillator means a target oscillator which is calibrated.

Figure 1:
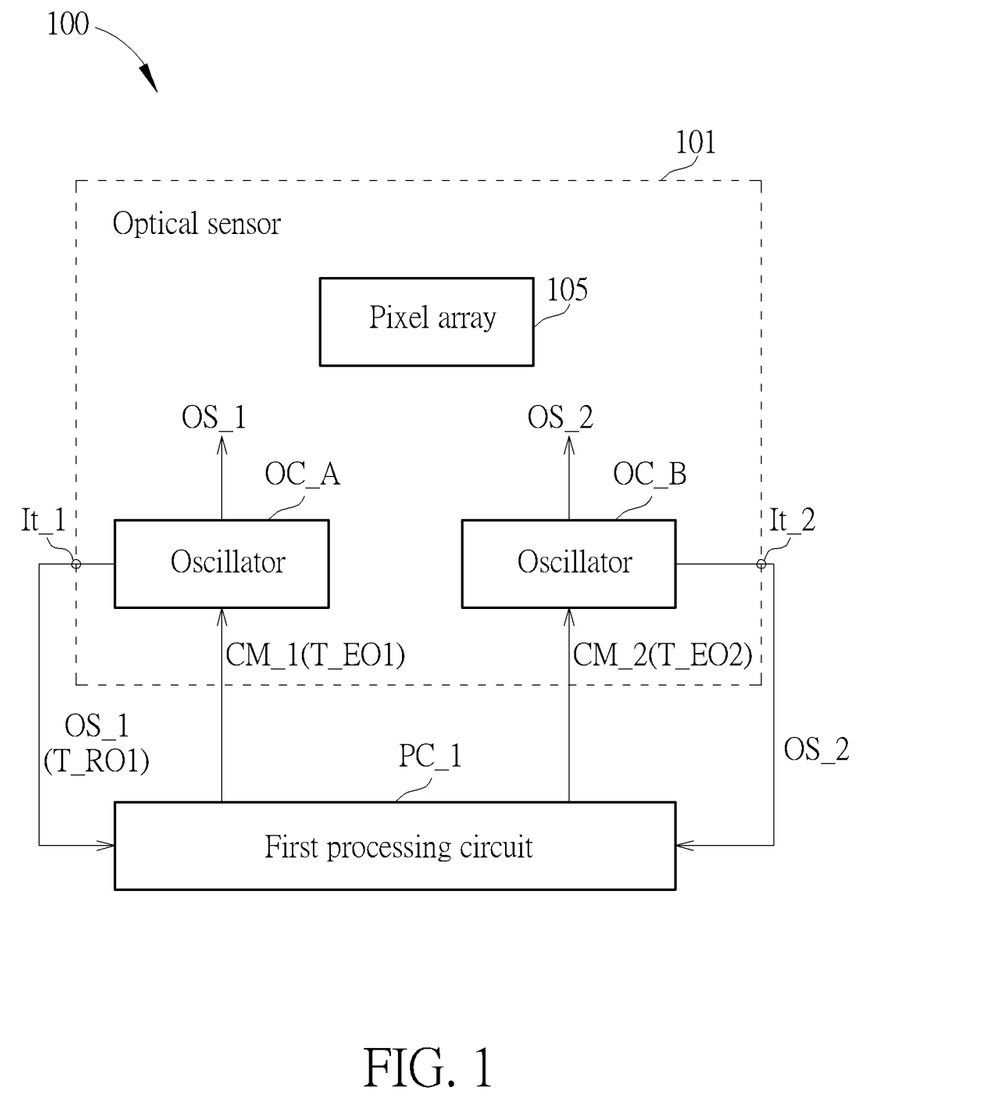
FIG. 1 is a block diagram illustrating an optical sensing system according to one embodiment of the present invention.

FIG. 1 is a block diagram illustrating an optical sensing system 100 according to one embodiment of the present invention. As shown in FIG. 1, the optical sensing system 100 comprises an optical sensor 101 and a first processing circuit PC_1. The optical sensor 101 comprises an oscillator OC_A and an oscillator OC_B. As above-mentioned, a first oscillator means an oscillator which is used as a reference for calibration, and a second oscillator means a target oscillator which is calibrated. In the embodiment of FIG. 1, the oscillator OC_A serves as the first oscillator and the oscillator OC_B serves as the second oscillator. Also, the optical sensor 101 may further comprise a first interface It_1 and a second interface It_2. The oscillator OC_A and the first processing circuit PC_1 can communicate via the first interface It_1, and the oscillator OC_B and the first processing circuit PC_1 can communicate via the second interface It_2. In one embodiment, the first interface It_1 and the second interface It_2 are GPIOs (General Purpose Input/Output).

In the embodiment of FIG. 1, the oscillator OC_A is configured to generate a first oscillating signal OS_1 with a first oscillating frequency. The oscillator OC_B is configured to generate a second oscillating signal OS_2 with oscillating frequency different from the first oscillating frequency. The optical sensor 101 computes an exposure time according to one of the first oscillating signal OS_1 and the second oscillating signal OS_2, and computes a frame interval time according to the other one of the first oscillating signal OS_1 and the second oscillating signal OS_2. In the embodiment of FIG. 1, the optical sensor 101 computes the exposure time according the first oscillating signal OS_1, and computes a frame interval time according to the second oscillating signal OS_2. The exposure time is time for exposing the pixels in the pixel array 105 in the optical sensor 100. Also, the frame interval time means a time interval between the start times of sensing of two consecutive frames. In such embodiment, the first oscillating frequency is higher than the second oscillating frequency.

The first processing circuit PC_1 generates a first command CM_1 to instruct the oscillator OC_A to oscillate for a first expected oscillating time T_EO1. However, the oscillator OC_A may only oscillates for a first real oscillating time T_RO1 responding to the first command CM_1 rather than the first expected oscillating time T_EO1. The first processing circuit PC_1 may acquire the first real oscillating time T_RO1 via computing a signal that the oscillator OC_A generates corresponding to the first command CM_1. For example, the oscillator OC_A generates a first oscillating signal OS_1 corresponding to the first command CM_1, and the first processing circuit PC_1 receives the first oscillating signal OS_1 and then acquires the first real oscillating time T_RO1 via computing the first oscillating signal OS_1.

Ideally, the first expected oscillating time T_EO1 should be equal to the first real oscillating time T_RO1. However, the first expected oscillating time T_EO1 and the first real oscillating time T_RO1 may have time difference since the oscillator OC_A is affected by a high temperature or any other factors. Accordingly, the first processing circuit PC_1 further computes a time relation between the first expected oscillating time T_EO1 and the first real oscillating time T_RO1. The time relation can be, for example, a time ratio between the first expected oscillating time T_EO1 and the first real oscillating time T_RO1. After acquiring the time relation, the first processing circuit PC_1 generates a second command CM_2 to instruct the oscillator OC_B to oscillate for a second expected oscillating time T_EO2 according to the time relation. In another embodiment, the time relation is a time difference.

In a practical example, the first processing circuit PC_1 generates the first command CM_1 to instruct the oscillator OC_A to oscillate for 500 us (the first expected oscillating time T_EO1), and the first real oscillating time T_RO1 is 450 us. In such case, the time ratio is $$\frac{450}{500} = 0.9.$$

After acquiring the time ratio 0.9, the first processing circuit PC_1 generates the second command CM_2 to instruct the oscillator OC_B to oscillate for a second expected oscillating time T_EO2 according to the time ratio. For example, if the oscillator OC_B is required to oscillate for 1000 ms, the first processing circuit PC_1 will generate the second command CM_2 to instruct the oscillator OC_B to oscillate for $$\frac{1000}{0.9} \approx 1111$$

ms. By this way, the real oscillating time of the oscillator OC_B corresponding to the second command CM_2 can be 1000 ms, thus the time drift caused by a high temperature can be compensated. Please note, the time ratio can also be used to calibrate the first oscillator (the oscillator OC_A) itself rather than limited to calibrate the second oscillator (the oscillator OC_B).

In one embodiment, the oscillator OC_B could not operate normally, until compensated according to the time relation. For example, before acquires the time relation, the first processing circuit PC_1 generates a third command to instruct the oscillator OC_B to oscillate for a third expected oscillating time. However, the real oscillating time of the oscillator OC_B corresponding to the third command is not equal to the third expected oscillating time, since the oscillator OC_B is not compensated yet. Then, following the above-mentioned embodiment, the first processing circuit PC_1 generates the second command CM_2 to instruct the oscillator OC_B to oscillate for the second expected oscillating time T_EO2 according to the time relation, thereby a second real oscillating time in which the oscillator OC_B really oscillates responding to the second command CM_2 is equal to the required third expected oscillating time.

Figure 2:
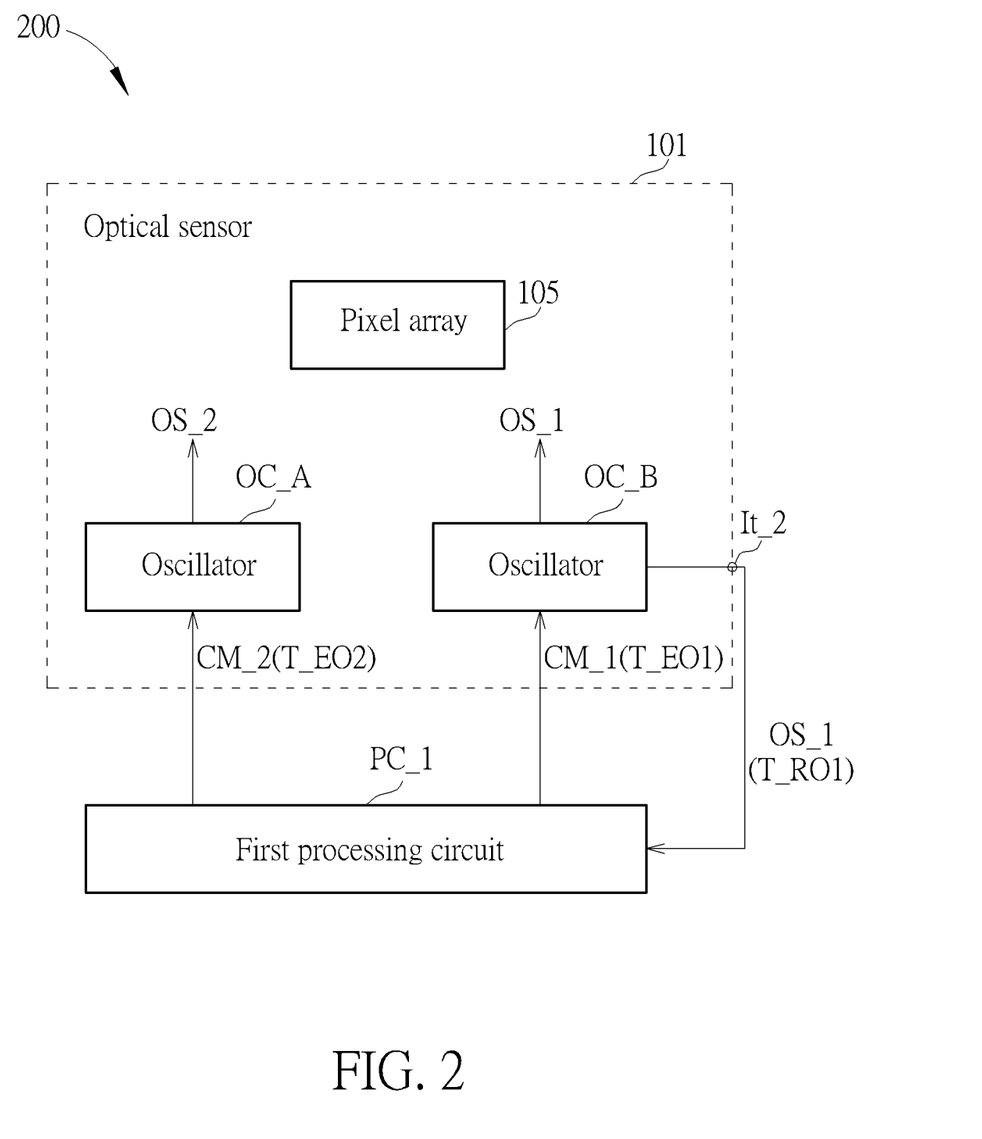
FIG. 2 is a block diagram illustrating an optical sensing system according to another embodiment of the present invention.

The optical sensing system provided by the present invention is not limited to the optical sensing system 100 illustrated in FIG. 1. FIG. 2 is a block diagram illustrating an optical sensing system 200 according to another embodiment of the present invention. The optical sensing system 200 comprises all components of the optical sensing system 100 besides the first interface It_1. Accordingly, in such embodiment, the first processing circuit PC_1 cannot acquire the real oscillating time of the oscillator OC_A. In such case, the oscillator OC_A serves as the above-mentioned second oscillator and the oscillator OC_B serves as the above-mentioned first oscillator.

In the embodiment of FIG. 2, the oscillator OC_B is configured to generate a first oscillating signal OS_1 with a first oscillating frequency. The oscillator OC_A is configured to generate a second oscillating signal OS_2 with a second oscillating frequency different from the first oscillating frequency. The optical sensor 101 computes an exposure time according to the second oscillating signal OS_2, and computes a frame interval time according to the first oscillating signal OS_1. In one embodiment, the first oscillating frequency is lower than the second oscillating frequency.

The first processing circuit PC_1 generates a first command CM_1 to instruct the oscillator OC_B to oscillate for a first expected oscillating time T_EO1. The first processing circuit PC_1 further acquires a first real oscillating time T_RO1 in which the oscillator OC_B really oscillates responding to the first command CM_1. For example, the oscillator OC_B generates a first oscillating signal OS_1 corresponding to the first command CM_1, and the first processing circuit PC_1 acquires a first real oscillating time T_RO1 in which the oscillator OC_B really oscillates responding to the first command CM_1. The steps of acquiring the first real oscillating time T_RO1 by the oscillator OC_B may be the same as acquiring the first real oscillating time T_RO1 by the oscillator OC_A illustrated in FIG. 1, thus descriptions thereof are omitted for brevity here.

Ideally, the first expected oscillating time T_EO1 should be equal to the first real oscillating time T_RO1. However, the first expected oscillating time T_EO1 and the first real oscillating time T_RO1 may have time difference since the oscillator OC_B is affected by a high temperature or any other factors. Accordingly, the first processing circuit PC_1 further computes a time relation between the first expected oscillating time T_EO1 and the first real oscillating time T_RO1. The time relation may be the above-mentioned time ratio. After acquiring the time relation, the first processing circuit PC_1 generates a second command CM_2 to instruct the oscillator OC_A to oscillate for a second expected oscillating time T_EO2 according to the time relation. In one embodiment, the first processing circuit PC_1 may generate a command to instruct the oscillator OC_B to oscillate according to the time relation. In other words, the time ratio can also be used to calibrate the first oscillator (the oscillator OC_B) rather than limited to calibrate the second oscillator (the oscillator OC_A).

In a practical example, the first processing circuit PC_1 generates the first command CM_1 to instruct the oscillator OC_B to oscillate for 1000 ms (the first expected oscillating time T_EO1), and the first real oscillating time T_RO1 is 900 ms. In such case, the time ratio is $$\frac{900}{1000} = 0.9.$$

After acquiring the time ratio 0.9, the first processing circuit PC_1 generates the second command CM_2 to instruct the oscillator OC_A to oscillate for a second expected oscillating time T_EO2 according to the time ratio. For example, if the oscillator OC_A is required to oscillate for 500 us, the first processing circuit PC_1 will generate the second command CM_2 to instruct the oscillator OC_A to oscillate for $$\frac{500}{0.9} \approx 555$$

us. By this way, the real oscillating time of the oscillator OC_A corresponding to the second command CM_2 can be 500 us, thus the time drift caused by a high temperature can be compensated.

In one embodiment, before calibrating the oscillator OC_B by the first processing circuit PC_1, the oscillator OC_B is calibrated according to a reference time defined by the oscillator OC_A. For example, define 1 second to a time interval in which the second oscillating signal OS_2 oscillates for 2 M times, and computes a reference number of times which the first oscillating signal OS_1 oscillates in the defined 1 second. For example, if the first oscillating signal OS_1 oscillates for 32 k times in the defined 1 second, the first processing circuit PC_1 can record the reference number is 32 k thus determines that the first oscillating signal OS_1 oscillates for 1 second if the first oscillating signal OS_1 oscillates for 32 k times. Following the same rule, the first processing circuit PC_1 can determine the above-mentioned first real oscillating time T_RO1 according to the number of times which the first oscillating signal OS_1 oscillates. Such rule can also be applied to any other real oscillating time.

After the oscillator OC_B is calibrated, the first processing circuit PC_1 can generate a command according to the time relation, to control the oscillator OC_B to oscillate for a required oscillating time. As shown in the embodiment of FIG. 2, the first processing circuit PC_1 generates a first command CM_1 to instruct the oscillator OC_B to oscillate for the first expected oscillating time T_EO1. However, in such case, the first real oscillating time T_RO1 is different from the first expected oscillating time T_EO1. Accordingly, after acquiring the time relation, the first processing circuit PC_1 generates a fourth command to instruct the oscillator OC_B to oscillate for a fourth expected oscillating time according to the time relation, thereby a third real oscillating time in which the oscillator OC_B really oscillates responding to the fourth command is equal to the first expected oscillating time T_EO1.

Figure 3:
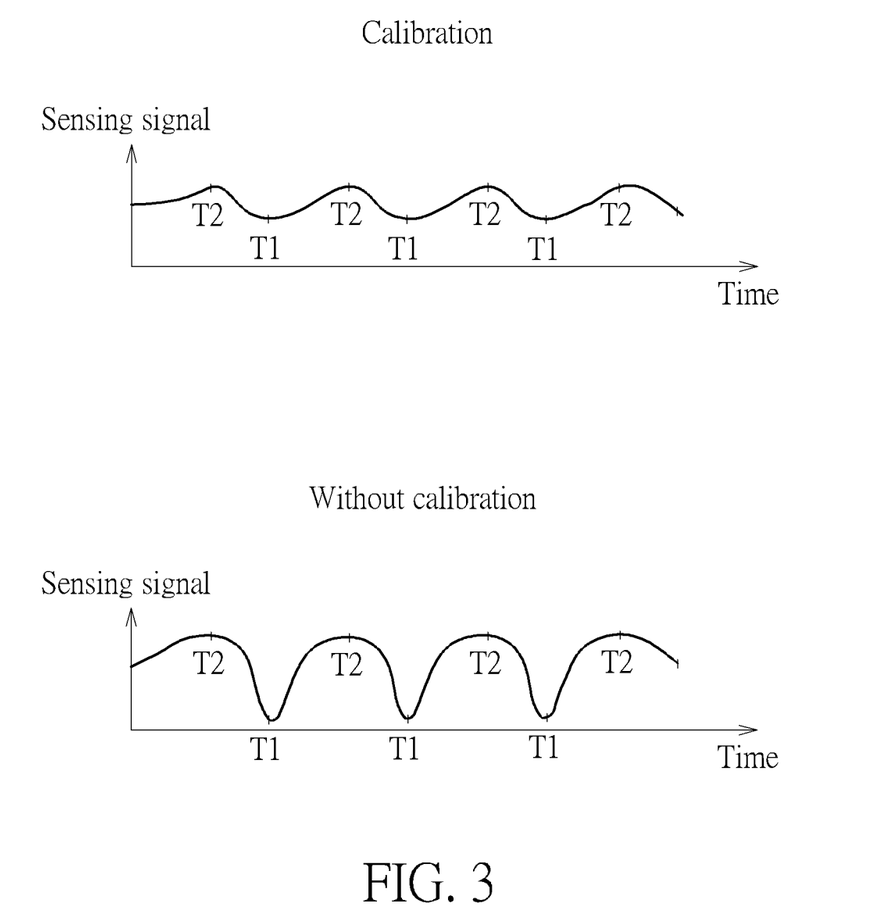
FIG. 3 is a schematic diagram illustrating the sensing signals of the optical sensor in FIG. 1 and FIG. 2, with calibration or without calibration, according to one embodiment of the present invention.

FIG. 3 is a schematic diagram illustrating the sensing signals of the optical sensor in FIG. 1 and FIG. 2, with calibration or without calibration, according to one embodiment of the present invention. The upper diagram in FIG. 3 illustrates sensing signals with calibration of the oscillator OC_A and the oscillator OC_B. The lower diagram in FIG. 3 illustrates sensing signals without calibration of the oscillator OC_A and the oscillator OC_B. Horizontal axes in FIG. 3 mean the time and vertical axes in FIG. 3 mean the amplitude of the sensing signal. Also, T1, T2 in FIG. 3 mean the temperature around the optical sensor 101, and T2 is higher than T1. As shown in FIG. 3, the sensing signal may decay when the temperature is the higher temperature T2. However, a decay level in the upper diagram is lower than the lower diagram. Accordingly, the calibration of the oscillator OC_A and the oscillator OC_B can reduce the signal decay caused by the high temperature.

Figure 4:
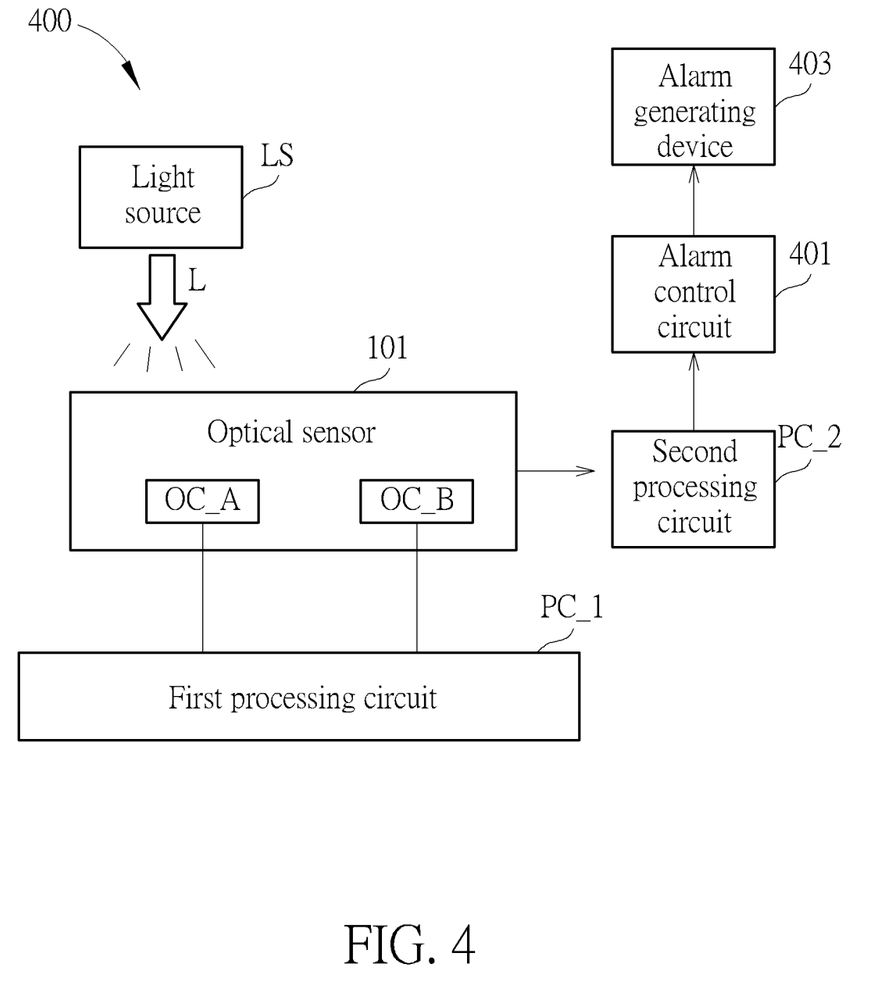
FIG. 4 is a block diagram illustrating a smoke detector according to one embodiment of the present invention.

The above-mentioned optical sensor can be applied to any electronic device. In one embodiment, the above-mentioned optical sensor 101 is applied to a smoke detector. FIG. 4 is a block diagram illustrating a smoke detector 400 according to one embodiment of the present invention. As shown in FIG. 4, the smoke detector 400 comprises a light source LS, a second processing circuit PC_2, the above-mentioned optical sensor 101 and the above-mentioned first processing circuit PC_1. The light source LS is configured to emit light L. The optical sensor 101 is configured to sense optical data generated according to the light L. For example, the optical sensor 101 sense optical data generated according to scattered light or reflected light of the light L.

The optical sensor 101 and the first processing circuit PC_1 may operate following above-mentioned embodiments. Accordingly, the above-mentioned time relation TL can be acquired. After acquiring the time relation TL, the second processing circuit PC_2 controls the smoke detector 400 to generate a first alarm according to the time relation TL. For more detail, the second processing circuit PC_2 controls the smoke detector 400 to generate the first alarm if the time relation TL is not in a specific range or is not a specific value. For example, if the time relation TL is a time ratio 1, it means the temperature does not increase such that no time drift of the oscillators OC_A and OC_B occur. On the opposite, if the time relation TL is a time ratio which is not 1, it means the temperature may increase due to the fire or an event which may cause fire. The first processing circuit PC_1 and the second processing circuit PC_2 can be two different processing circuits, or the first processing circuit PC_1 and the second processing circuit PC_2 can be integrated to a single processing circuit.

For a conventional smoke detector, if no fire breaks out, no smoke exists thus no scatted light of the light L exists or only a few scatted light of the light L exists. In such case, the optical data (e.g., an image) sensed by the optical sensor 101 have a first light intensity. On the contrary, if fire breaks out, the smoke may cause a large amount of scattered light of the light L, thus the optical data sensed by the optical sensor 101 have a second light intensity. Accordingly, the smoke detector 400 may generate alarms according to the light intensity sensed by the optical sensor 101. However, such mechanism may cause false alarms, since the smoke may be caused by other factors such as cooking rather than fire.

To improve such problem, the smoke detector 400 provided by the present invention may generate an alarm according to the time relation TL. In one embodiment, the smoke detector 400 further comprises an alarm control circuit 401 and an alarm generating device 403. The alarm control circuit 401 can be integrated to the second processing circuit PC_2. In one embodiment, the second processing circuit PC_2 controls the alarm generating device 403 to generate the first alarm according to the time relation TL before controls the alarm generating device 403 to generate a second alarm according to the optical data. In other words, the smoke detector 400 may generate two stages of alarms: generate a first alarm according to the time relation TL first (i.e., responding to a high temperature), and then generates a second alarm according to the optical data (i.e., responding to the smoke).

Please note, in one embodiment, the optical sensor 101 of the smoke detector 400 comprises the first oscillator but does not comprise the second oscillator. In such case, the time relation TL generated according to oscillating signals of the first oscillator can be still used to generate the alarm but is not used to calibrate oscillating signals of the second oscillator. In another embodiment, the optical sensor 101 of the smoke detector 400 still comprises the first oscillator and the second oscillator. However, the time relation TL generated according to oscillating signals of the first oscillator is used to generate the alarm but is not used to calibrate oscillating signals of the second oscillator.

Such operations may have various advantages. For example, if a machine has error and burns to cause fire, the increasing of the temperature occurs very rapidly and is before the generation of smoke. Accordingly, the event which may cause fire can be detected soon before the fire really occurs. Besides, the two stages of alarms can improve the false alarms. For example, a user can determine the fire really occurs the first alarm corresponding to the high temperature increasing occurs and then the second alarm corresponding to the smoke occurs.

In another embodiment, the second processing circuit PC_2 controls the alarm generating device 403 to generate the first alarm simultaneously according to the optical data and the time relation TL. In other words, the second processing circuit PC_2 controls the alarm generating device 403 to generate the first alarm only when the temperature increases and the smoke exist. By this way, the conventional false alarm generated responding to smoke which is not generated by fire can be avoided.

Figure 5:
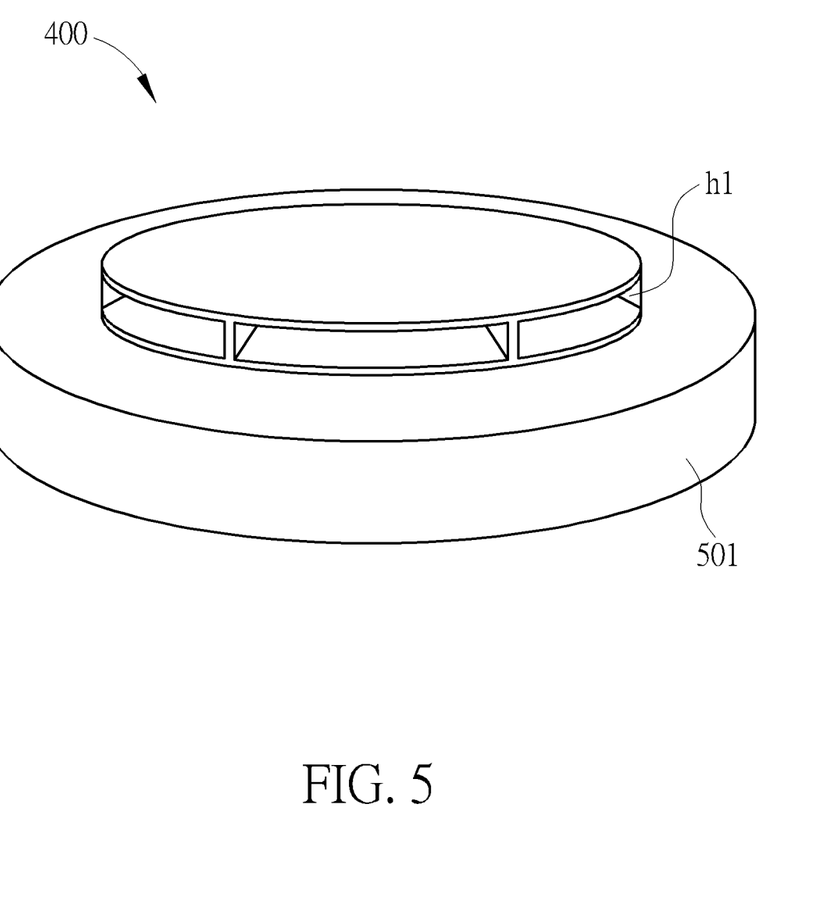
FIG. 5 is an external view of the smoke detector illustrated in FIG. 4, according to one embodiment of the present invention.

FIG. 5 is an external view of the smoke detector 400 illustrated in FIG. 4, according to one embodiment of the present invention. It will be appreciated that the smoke detector provided by the present invention is not limited to such example. As shown in FIG. 5, the smoke detector 400 comprises a case 501 with holes (only a hole h1 is symbolized for explaining). The components illustrated in FIG. 4 can be provided in the case 501. The above-mentioned smoke can enter the case 501 to trigger the alarm.

Figure 6:
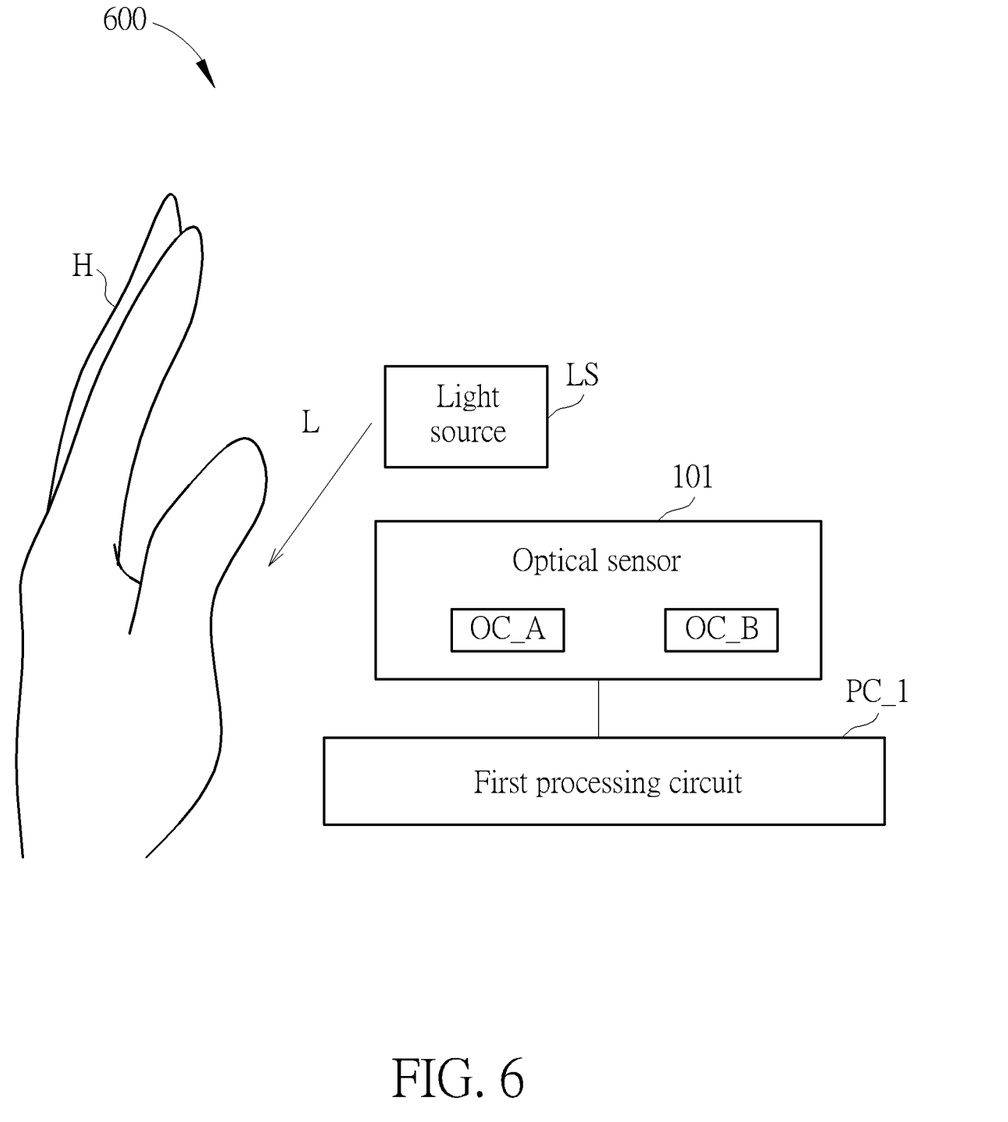
FIG. 6 is a block diagram illustrating a TOF (Time Of Flight) system according to one embodiment of the present invention.

Besides the smoke detector, the optical sensing system provided by the present invention can also be applied to other electronic devices. FIG. 6 is a block diagram illustrating a TOF (Time Of Flight) system according to one embodiment of the present invention. As shown in FIG. 6, the TOF system 600 comprises a light source LS, the optical sensor 101 and the first processing circuit PC_1. The optical sensor 101 is configured to sense optical data generated according to the light L. For example, the optical sensor 101 senses optical data generated according to reflected light of the light L. The first processing circuit PC_1 is further configured to compute a location of an object (e.g., a hand H) according to the optical data.

The optical sensor 101 and the first processing circuit PC_1 may operate following above-mentioned embodiments, to compensate the oscillator OC_A and the oscillator OC_B in the optical sensor 101. Accordingly, the TOF system 600 may still operate smoothly even the temperature around the TOF system 600 increases. The smoke detector 400 illustrated in FIG. 4 can be integrated to the TOF system 600.

Figure 7:
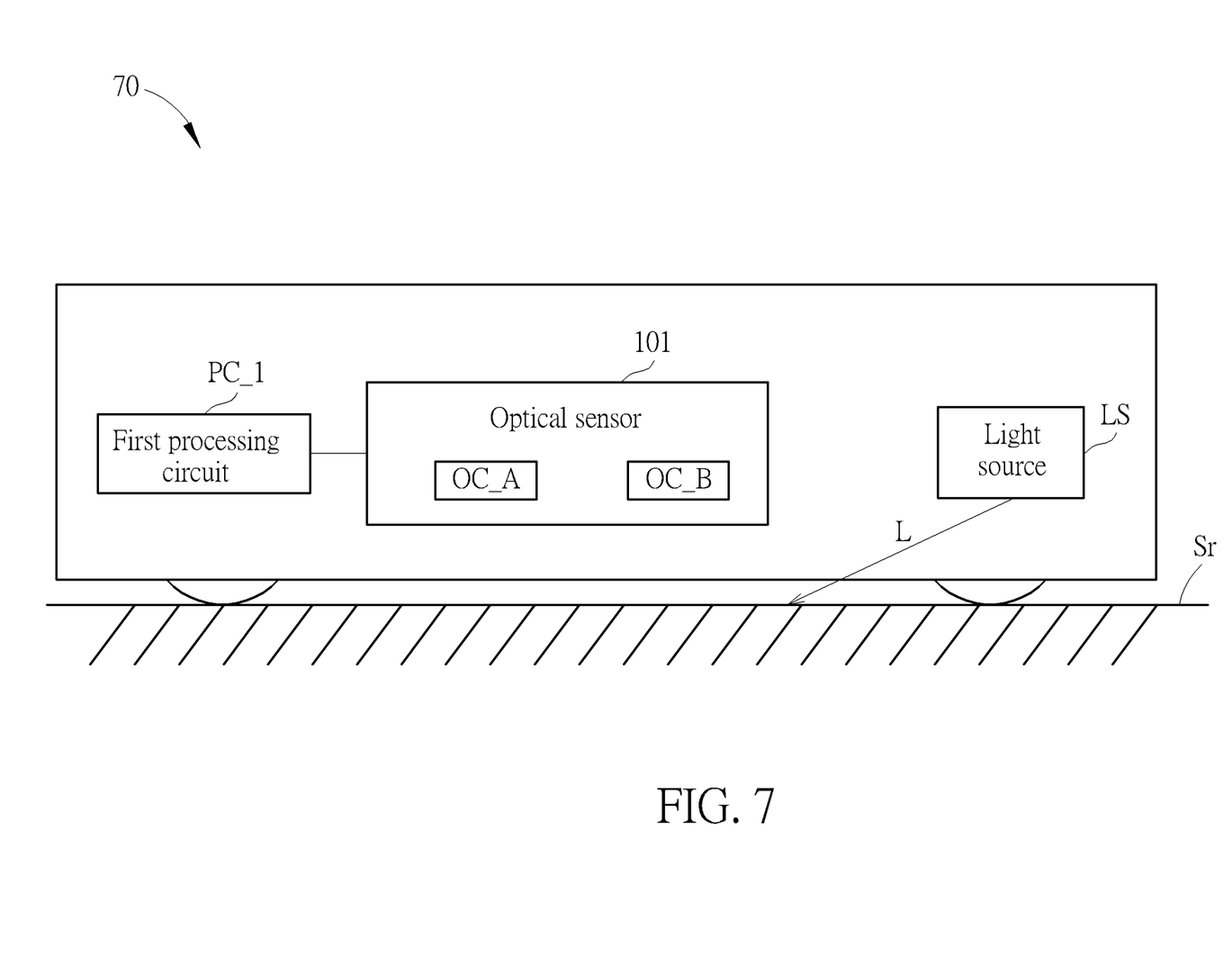
FIG. 7 is a block diagram illustrating an automatic cleaning machine according to one embodiment of the present invention.

FIG. 7 is a block diagram illustrating an automatic cleaning machine 700 according to one embodiment of the present invention. As shown in FIG. 7, the automatic cleaning machine 700 comprises a light source LS, the optical sensor 101 and the first processing circuit PC_1. The light source LS is configured to emit light L to a working surface Sr (e.g., an earth). The optical sensor 101 is configured to sense optical data generated according to the light L. For example, the optical sensor 101 senses optical data generated according to reflected light of the light L. The first processing circuit PC_1 is further configured to compute a location of the automatic cleaning machine 700 according to the optical data. The optical sensor 101 and the first processing circuit PC_1 may operate following above-mentioned embodiments, to compensate the oscillator OC_A and the oscillator OC_B in the optical sensor 101. Accordingly, the automatic cleaning machine 700 may still operate smoothly even the temperature around the automatic cleaning machine 700 increases. The smoke detector 400 illustrated in FIG. 4 can be integrated to the automatic cleaning machine 700.

In view of above-mentioned embodiments, the signal decay of an optical sensor's sensing signals caused a high temperature can be compensated. Besides, a smoke detector provided by the present invention can generate a fire alarm more rapidly and more precisely.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A smoke detector, comprising:
   a light source, configured to emit light;

an optical sensor, configured to sense optical data generated according to the light, comprising;
  a first oscillator, configured to generate a first oscillating signal with a first oscillating frequency; and
  a second oscillator, configured to generate a second oscillating signal with a second oscillating frequency different from the first oscillating frequency;
a first processing circuit, configured to generate a first command to instruct the first oscillator to oscillate for a first expected oscillating time, and configured to receive the first oscillating signal and then acquire a first real oscillating time in which the first oscillator really oscillates responding to the first command, wherein the first processing circuit further computes a time relation between the first expected oscillating time and the first real oscillating time, wherein the first processing circuit generates a second command to instruct the second oscillator to oscillate for a second expected oscillating time according to the time relation; and
a second processing circuit, configured to control the smoke detector to generate a first alarm according to the time relation.

2. The smoke detector of claim 1, wherein the second processing circuit controls the smoke detector to generate the first alarm according to the time relation before controls the smoke detector to generate a second alarm according to the optical data.

3. The smoke detector of claim 1, wherein the second processing circuit controls the smoke detector to generate the first alarm simultaneously according to the optical data and the time relation.

4. The smoke detector of claim 1,
  wherein first processing circuit further generates a third command to instruct the second oscillator to oscillate for a third expected oscillating time before acquires the time relation;
  wherein the first processing circuit generates the second command to instruct the second oscillator to oscillate for the second expected oscillating time according to the time relation, thereby a second real oscillating time in which the second oscillator really oscillates responding to the second command is equal to the third expected oscillating time.

5. The smoke detector of claim 1, wherein the optical sensor computes an exposure time according to one of the first oscillating signal and the second oscillating signal, and computes a frame interval time according to the other one of the first oscillating signal and the second oscillating signal.

6. The smoke detector of claim 1, wherein the first oscillating frequency is higher than the second oscillating frequency.

7. The smoke detector of claim 6, wherein the optical sensor computes an exposure time according to the first oscillating signal and computes a frame interval time according to the second oscillating signal.

8. The smoke detector of claim 1, wherein the first oscillating frequency is lower than the second oscillating frequency.

9. The smoke detector of claim 8, wherein the optical sensor computes a frame interval time according to the first oscillating signal and computes an exposure time according to the second oscillating signal.

10. The smoke detector of claim 1,
  wherein first processing circuit further generates a fourth command to instruct the first oscillator to oscillate for a fourth expected oscillating time according to the time relation, thereby a third real oscillating time in which the first oscillator really oscillates responding to the second command is equal to the first expected oscillating time.

11. The smoke detector of claim 1, wherein the time relation is a time ratio between the first expected oscillating time and the first real oscillating time.

12. A smoke detector, comprising:
  a light source, configured to emit light;
  an optical sensor, configured to sense optical data generated according to the light, comprising;
    a first oscillator, configured to generate a first oscillating signal with a first oscillating frequency; and
    a first processing circuit, configured to generate a first command to instruct the first oscillator to oscillate for a first expected oscillating time, and configured to receive the first oscillating signal and then acquire a first real oscillating time in which the first oscillator really oscillates responding to the first command, wherein the first processing circuit further computes a time relation between the first expected oscillating time and the first real oscillating time; and
  a second processing circuit, configured to control the smoke detector to generate a first alarm according to the time relation.

* * * * *